(12) United States Patent
Cole et al.

(10) Patent No.: US 8,032,021 B2
(45) Date of Patent: Oct. 4, 2011

(54) STATUS LINK FOR MULTI-CHANNEL OPTICAL COMMUNICATION SYSTEMS

(75) Inventors: Christopher R. Cole, Redwood City, CA (US); Lewis B. Aronson, Los Altos, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 810 days.

(21) Appl. No.: 12/039,595

(22) Filed: Feb. 28, 2008

(65) Prior Publication Data

US 2008/0205900 A1 Aug. 28, 2008

Related U.S. Application Data

(60) Provisional application No. 60/892,060, filed on Feb. 28, 2007, provisional application No. 60/892,143, filed on Feb. 28, 2007, provisional application No. 60/892,065, filed on Feb. 28, 2007.

(51) Int. Cl.
*H04B 10/08* (2006.01)

(52) U.S. Cl. .............. 398/25; 398/30; 398/32; 398/33; 398/38; 398/180; 398/181

(58) Field of Classification Search .............. 398/9–38, 398/153–162, 180, 181
See application file for complete search history.

(56) References Cited

U.S. PATENT DOCUMENTS

| | | | |
|---|---|---|---|
| 4,994,675 A * | 2/1991 | Levin et al. | 250/551 |
| 5,515,361 A * | 5/1996 | Li et al. | 370/222 |
| 5,995,256 A | 11/1999 | Fee | 398/34 |
| 6,295,272 B1 * | 9/2001 | Feldman et al. | 370/210 |
| 6,359,713 B1 * | 3/2002 | DeCusatis et al. | 398/178 |
| 6,483,616 B1 * | 11/2002 | Maddocks et al. | 398/1 |
| 6,931,183 B2 | 8/2005 | Panak et al. | |
| 7,826,745 B2 * | 11/2010 | DeCusatis et al. | 398/75 |
| 2002/0114038 A1 * | 8/2002 | Arnon et al. | 359/145 |
| 2003/0025957 A1 * | 2/2003 | Jayakumar | 359/110 |
| 2003/0095303 A1 * | 5/2003 | Cunningham et al. | 359/110 |
| 2004/0257642 A1 * | 12/2004 | Fishman et al. | 359/341.3 |
| 2006/0018659 A1 * | 1/2006 | Sekine et al. | 398/79 |
| 2006/0153503 A1 | 7/2006 | Suzuki et al. | |

(Continued)

FOREIGN PATENT DOCUMENTS

JP 11-194238 A 7/1999

(Continued)

OTHER PUBLICATIONS

U.S. Appl. No. 12/112,214, filed Apr. 30, 2008, Cole, et al.

(Continued)

*Primary Examiner* — Li Liu

(74) *Attorney, Agent, or Firm* — Maschoff Gilmore & Israelsen

(57) ABSTRACT

A robust and redundant status link is established by a first multi-channel optoelectronic device with a second multi-channel optoelectronic device in a multi-channel communication link. Transmitter bias currents are effectively modulated with a status link modulation signal representative of status data and subsequently modulated with primary data modulation signals. The resulting signals are transformed into optical signals and transmitted over the link as main communication links combined with a status link. At the second device, the optical signals are received and converted to electrical signals. The receipt of the optical signals creates multiple receiver bias currents, which may be monitored to detect the status link modulation signal. The second device may adjust various operating parameters in response to the information conveyed by the status link. For instance, devices can use status links to operate above nominal eye safety limits and/or to adjust transmit power to compensate for degradation effects.

14 Claims, 10 Drawing Sheets

U.S. PATENT DOCUMENTS

2009/0060520 A1* 3/2009 Cole et al. .................. 398/140

FOREIGN PATENT DOCUMENTS

| | | |
|---|---|---|
| JP | 2006-114684 A | 4/2006 |
| KR | 20-0180217 Y1 | 5/2000 |
| KR | 20-0309948 Y1 | 3/2003 |
| KR | 20-0399085 Y1 | 9/2005 |

OTHER PUBLICATIONS

U.S. Appl. No. 12/039,589, filed Feb. 28, 2008, Cole, et al.
Joiner, Steve, "Open Fiber Control for Parallel Optics," Hewlett Packard, Communication Semiconductor Solutions Division, Mar. 27, 1997.

* cited by examiner

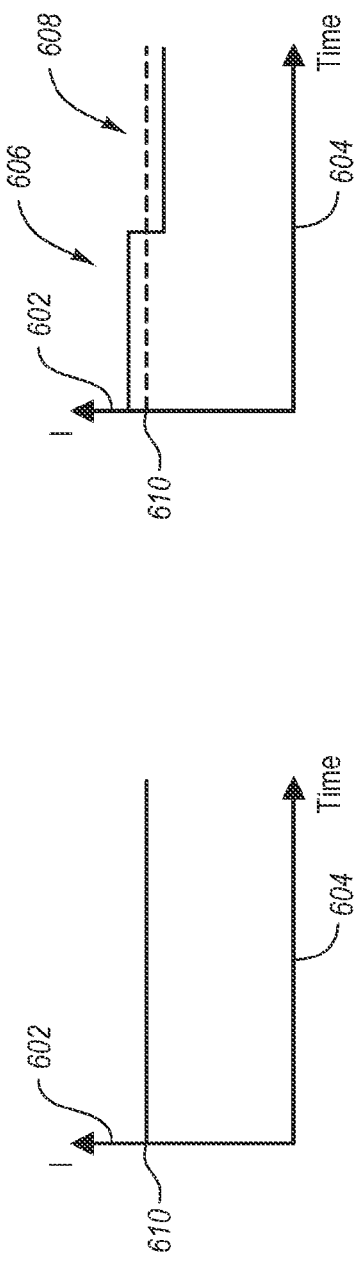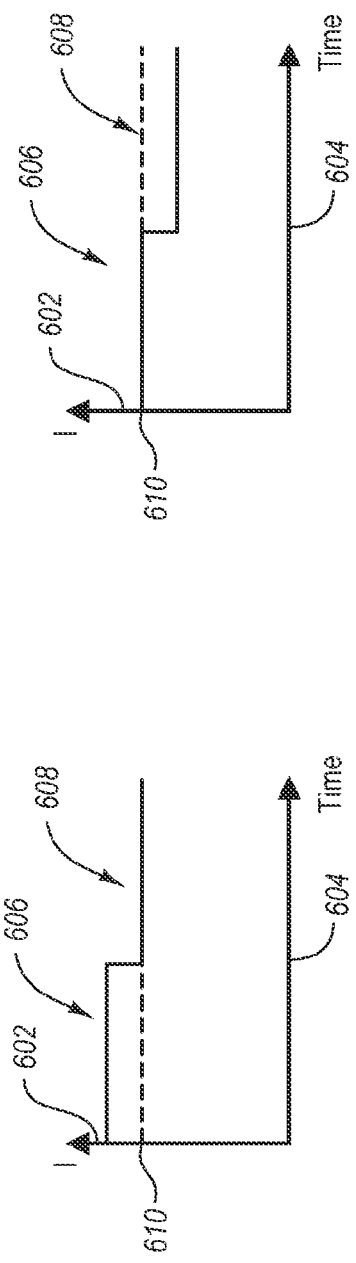

STATUS LINK FOR MULTI-CHANNEL OPTICAL COMMUNICATION SYSTEMS

CROSS-REFERENCE TO RELATED APPLICATIONS

This application claims the benefit of U.S. Provisional Patent Application Ser. No. 60/892,060 entitled STATUS LINK FOR MULTI-CHANNEL OPTICAL COMMUNICATION SYSTEMS, filed Feb. 28, 2007, U.S. Provisional Patent Application Ser. No. 60/892,143, entitled USE OF STATUS LINKS TO OPERATE OPTICAL TRANSCEIVER ABOVE NOMINAL EYE SAFETY LIMIT, filed Feb. 28, 2007, and U.S. Provisional Patent Application Ser. No. 60/892,065, entitled USE OF STATUS LINKS FOR ADJUSTING TRANSMIT POWER IN MULTI-CHANNEL OPTICAL COMMUNICATION SYSTEMS, filed Feb. 28, 2007. The foregoing patent applications are herein incorporated by reference.

BACKGROUND OF THE INVENTION

1. The Field of the Invention

The present invention relates generally to systems, methods, and devices for high speed data transmission. More particularly, embodiments of the invention concern systems, methods, and devices for providing a redundant and robust status link in a multi-channel optical communication system and applications thereof.

2. The Relevant Technology

Computing and networking technology have transformed our world. As the amount of information communicated over networks has increased, high speed transmission has become ever more critical. Many high speed data transmission networks rely on optoelectronic devices for facilitating transmission and reception of digital data embodied in the form of optical signals over optical fibers. Optical networks are thus found in a wide variety of high speed applications ranging from modest Local Area Networks (LANs) to backbones that define a large portion of the infrastructure of the Internet.

Typically, data communication in such networks is implemented by way of an optoelectronic device, such as a transceiver or transponder, that includes an optical transmitter for optical data transmission and an optical receiver for optical data reception. As demands for higher data transmission speeds between points in optical networks have increased, optoelectronic devices have been developed with multiple optical transmitters and multiple optical receivers to transmit and receive optical signals over multiple signal channels. These multi-channel optoelectronic devices often utilize one of several different types of signal channels, such as multiple ribbon fibers, multiple wavelengths or in-phase and quadrature-phase channels. Every signal channel requires its own transmitter and receiver. To support N duplex channels, a multi-channel optoelectronic device therefore requires at least N transmitters and at least N receivers.

It is often desirable in optical networks to implement a status link between optoelectronic devices, whether the devices are multi-channel or single-channel. The status link can be used to provide information to the devices about each device and/or the physical link between the devices. Conventional status links are often implemented by signaling between optoelectronic devices over spare fibers and/or by superimposing the status link out-of-band (OOB) on a single signal channel. These schemes require additional components and/or are subject to the same failure modes as the signal channel.

Additionally, one of the problems associated with multi-channel optical links is that of eye safety. Consider a multi-channel optical link that includes a first multi-channel optoelectronic device at one location and a second multi-channel optoelectronic device at another location. One or more first fibers couple the transmitters of the first device to the receivers of the second device while one or more second fibers couple the transmitters of the second device to the receivers of the first device. If either of the first or second fibers is removed from the first or second device, one or more transmitters may still be transmitting, either over a fiber(s) or into free-space, exposing emitted optical signals to view. At certain frequencies, the exposed optical signals can cause minimal to severe damage to a human eye if viewed. The potential damage may increase as the number of transmitters emitting optical signals increases, thereby posing an eye safety risk even if each individual transmitter's power is well below what is considered safe.

Conventional solutions for ensuring eye safety limit the optical link budget or implement mechanical interlocks or shutters in the optical fibers. In the case of the former, the limited optical link budget limits the distance over which information can be transmitted and/or the maximum number of transmitters that can be implemented before the aggregate power of the link exceeds the nominal eye safety limit. In the case of the latter, the mechanical interlocks/shutters are ineffective if an opening occurs at a point other than at the interlock or shutter trigger points. Additionally, both conventional solutions may require the use of additional components in the optical link, increasing its cost and/or complexity.

Additionally, multi-channel optical links are typically required to meet one or more specifications over the lifetime of the hardware. Age and other factors can degrade the performance of certain components, degrading in turn the quality of the optical signals transmitted over the optical links. For example, the optical signals emitted by a transmitter often attenuate as the transmitter ages, even though the transmitter bias current remains constant. This degradation in signal strength can increase bit error rates and ultimately result in loss of the signal. For this reason, optoelectronic devices and other hardware must be designed to operate at the worst operating point at the end of life for the hardware, which may produce operating inefficiencies at the beginning of life of the hardware.

In some cases, degradations in optical signal quality may be compensated for by adjusting one or more parameters. For instance, increasing the transmit power of an aging transmitter can compensate for age-attenuation. Some optoelectronic devices implement digital monitor and control techniques with a controller to identify degradation effects and compensate accordingly. However, not all degradation effects can be identified, in which case some may remain untreated. For example, an optoelectronic device may be unable to identify degradation effects outside of the device which nonetheless affect optical signal quality, such as the degradation of the optical medium over which a transmitter emits an optical signal or degradation of the mechanical connection between the device and the optical medium. Because the device is unable to identify the problem, the device does nothing to compensate for it.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

Embodiments of the present invention are directed to systems and methods for communicating status information over a multi-channel communication link. In particular, embodiments of the invention enable the use of two or more signal channels to simultaneously convey a status link with two or more main communication links. In this manner, each end of the multi-channel communication link can obtain information about the other end of the link, which permits functions to improve the quality of the main communication links, including operating above a nominal eye safety limit and/or adjusting transmit power to compensate for degradation. Advantageously, redundantly conveying the status data over two or more of the main communication links provides a high failure tolerance in the event that one or more of the main communication links is impaired.

In one embodiment of the invention, a first optoelectronic device establishes a redundant status link with a second optoelectronic device in a multi-channel communication link. To establish a status link, the first device generates a low frequency status link modulation signal from status data and effectively applies the status link modulation signal to at least two transmitter bias currents of the first device to generate at least two status-link modulated transmitter bias currents. Each status-link modulated transmitter bias current can be provided to a different transmitter as-is, or each can be further modulated with a different high frequency primary data modulation signal representative of primary data before being provided to a different transmitter. The transmitters transform the received electrical signals to optical signals which are transmitted over a multi-channel communication link to the second device. The optical signals are representative of the status data and optionally the primary data as well.

The status link established with the second device can be detected by the second device by receiving the optical signals, converting the optical signals to electrical signals with a plurality of optical receivers, and detecting the receiver bias currents of the optical receivers to extract the status data. In a similar manner, the first device can detect a status link established by the second device with the first device. Advantageously, the status data received via a redundant status link can be used by the first or second device to adjust one or more parameters.

For instance, in one embodiment, a redundant status link enables operation of a multi-channel optical communication link above nominal eye safety limits. In this embodiment, a first device communicating over a plurality of transmit and receive channels with a second device establishes a status link with the second device. The first device determines that optical signals received from the second device over the receive channels are not potentially exposed to view and sends status data over the status link to the second device indicating it is safe for the second device to transmit optical signals to the first device over the receive channels at an aggregate optical transmit power that is greater than a predetermined eye safety limit. The second device can then transition to or maintain operation in a transmit power mode where its aggregate optical output exceeds the predetermined eye safety limit until it stops receiving the status data from the first device. In a similar manner, the second device can send the first device status data regarding potential exposure of its transmit optical signals such that the first device can transition to or maintain operation in a transmit power mode where its aggregate optical output exceeds the predetermined eye safety limit.

In another embodiment, a redundant status link can be used to compensate for degradation effects affecting a multi-channel optical communication link. In this embodiment, the first device establishes the status link with the second device, monitors the status of the receive channels, and transmits status data indicative of the status of the receive channels to the second device over the status link. The second device can receive the status data and use it to adjust the transmit power of one or more of its optical transmitters. Similarly, the second device can establish a status link with the first device, monitor the status of the transmit channels, and transmit status data indicative of the status of the transmit channels to the first device over the status link established with the first device. The first device can receive the status data and use it to adjust the transmit power of one or more of its optical transmitters.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 6A-6D illustrate various plots of transmitter biasing currents;

DETAILED DESCRIPTION OF THE PREFERRED EMBODIMENTS

Reference will now be made to the drawings to describe various aspects of exemplary embodiments of the invention.

It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with transmitting and receiving status data between optoelectronic devices. More particularly, embodiments of the invention enable the redundant transmission and receipt of status data over multiple signal channels. The status data can be used, for instance, to operate a multi-channel optical link at a transmit power mode higher than a nominal eye safety limit while preserving actual eye safety and/or to adjust the transmit power of a multi-channel optoelectronic device to compensate for age and/or other degradation effects. Embodiments of the invention can apply to optical communication links implementing various multi-channel transmission techniques, including wavelength division multiplexing (WDM), parallel optics, and in-phase and quadrature-phase (I and Q) channels.

Figure 1:
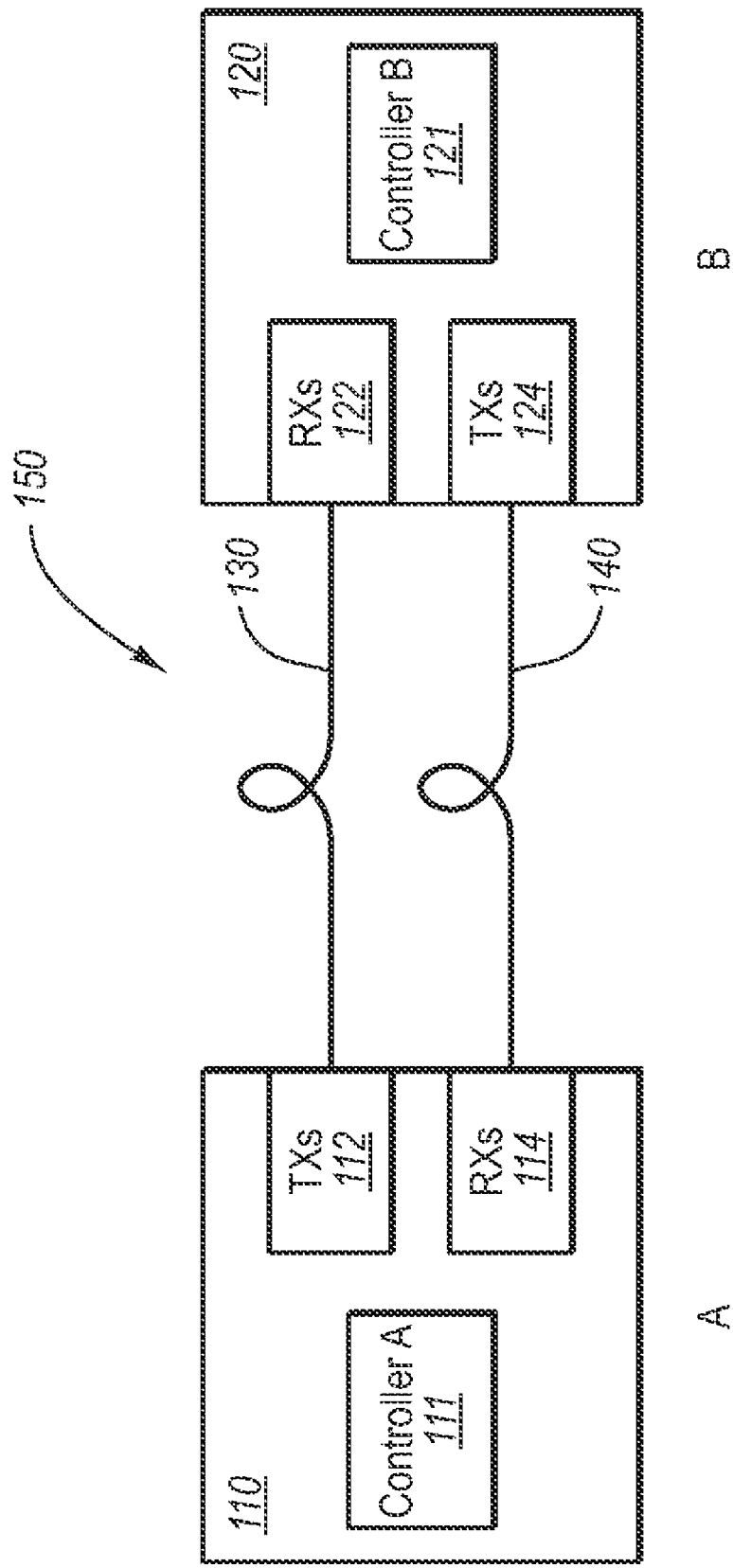
FIG. 1 schematically illustrates an example operating environment in which embodiments of the invention can be implemented.

FIG. 1 illustrates an example optical communication link 150 in which embodiments of the present invention may be implemented. The link 150 includes an optoelectronic device 110 at point A (e.g., device A) and an optoelectronic device 120 at point B (e.g., device B). Device A 110 is status-link enabled, meaning it is capable of establishing a status link with another optoelectronic device. The process of establishing a status link is described more fully below. Optoelectronic device A 110 includes a controller 111, N transmitters 112 and N receivers 114. Similarly, optoelectronic device B 120 is status-link enabled and includes a controller 121, N transmitters 124, and N receivers 122. Alternately or additionally, device A 110 and/or device B 120 may include one or more spare transmitters and/or receivers for providing failure tolerance.

In the A-to-B direction of the link 150, device A 110 can receive N electrical input signals from a first host (not shown), convert them to optical signals, and transmit the N optical signals over fiber optic cable(s) 130 to device B 120 where device B 120 converts them to N electrical output signals for a second host (not shown). Similarly, in the B-to-A direction, device B 120 can receive N electrical input signals from the second host, convert them to optical signals and transmit the N optical signals over fiber optic cable(s) 140 to device A 110 where device A 110 converts them to N electrical output signals for the first host. If the link 150 implements parallel optics, every optical signal is transmitted over a separate physical channel (e.g., a separate fiber) and fiber optic cables 130 and 140 may individually or jointly comprise one or more parallel ribbon fiber bundles. If the link 150 implements WDM, each optical signal is transmitted over a separate wavelength channel and the optical signals in each direction may be optically multiplexed onto a fiber optic cable 130 or 140 (or onto a single bidirectional fiber optic cable).

According to embodiments of the invention, status data may be transmitted between devices A and B of the optical link 150. The status data may indicate, for instance, the status of the communications channels (e.g., the physical or wavelength channels carrying data), that it is okay to transmit at a normal transmit power mode with an aggregate optical output that is higher than a nominal eye safety limit, or the like or any combination thereof. The status data may be conveyed by itself or simultaneously with primary data without impairing or degrading the quality or speed of transmission of the primary data. As used herein, the term "primary data" includes data such as customer data, voice data or computer data that does not control or provide information regarding the operation or status of a multi-channel point-to-point communication system. Primary data is conveyed over one or more main communication links or communication channels. "Status data," "status information" and variations thereof are interchangeable terms that refer to data other than primary data, that provides information regarding or controls the operation or status of a multi-channel point-to-point communication system. Status data is conveyed over a status link and can be used to improve the quality of the main communication links.

The optical communication link 150 of FIG. 1 illustrates one system architecture in which embodiments of the present invention can be implemented. More generally, however, embodiments of the present invention can be implemented in any system architectures in which data is transmitted and received between optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can exemplarily be used in telecommunications networks, local area networks, metro area networks, storage area networks, wide area networks, and the like. The principles of the present invention may be implemented in optoelectronic devices of any form factor currently available or that may be developed in the future. It will be appreciated, however, that the optoelectronic devices need not comply with standardized form factor requirements and may have any size or configuration necessary according to a particular design. The principles of the present invention are suitable for use with, for example, 10G, 40G, 50G, 100G and higher transmission speeds, without restriction.

Briefly, to establish a redundant status link, controller A 111 effectively modulates transmitter bias currents for two or more of the N transmitters 112 of device A 110 with a low frequency status link modulation signal representative of status data generated by controller A. Similarly, controller B 121 can establish a status link with controller A by effectively modulating transmitter bias currents for two or more of the N transmitters 124 of device B 120 with a low frequency status link modulation signal representative of status data generated by controller B. In this manner, each controller establishes a status link with the other over two or more channels. The controllers use the redundant status links to convey status data to each other, and the status data may be used to optimize the performance of the optical link 150.

Figure 2:
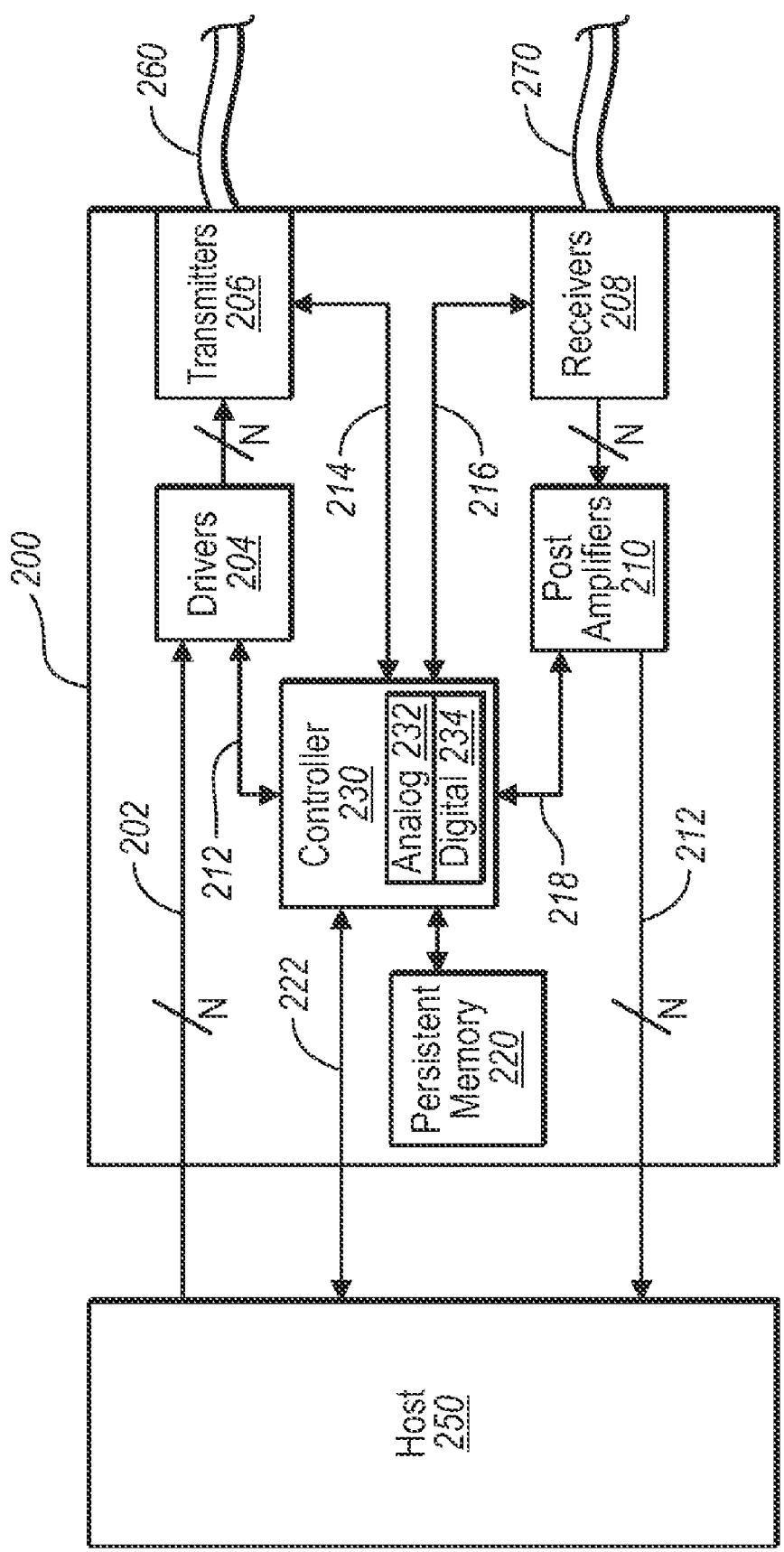
FIG. 2 schematically illustrates an example optoelectronic device that may implement features of the present invention and can be implemented in the environment of FIG. 1.

With additional reference to FIG. 2, a simplified block diagram of an example multi-channel optoelectronic device 200 is illustrated. The device 200 may comprise, for instance, a multi-channel transponder or transceiver, and corresponds in one embodiment to the devices 110 and/or 120 of FIG. 1. FIG. 2 further depicts the interaction between the device 200, a host 250 and fiber optic cables 260, 270. The multi-channel optoelectronic device 200 implements parallel optics to transmit N primary data channels and receive N primary data channels over parallel ribbon fibers 260, 270, respectively.

While the optoelectronic device 200 and related components (e.g., host, fiber optic cables, etc.) will be described in some detail, they are described by way of illustration only, and not by way of restricting the scope of the invention. In particular, some of the components used to facilitate one type of multi-channel transmission technique may or may not be necessary in another type of multi-channel transmission technique. For instance, in the present embodiment, the fiber optic cables 260, 270 may each comprise MPO 12 fiber patch cord, made up of multiple single-mode or multi-mode fibers (e.g., SMF or MMF). In another embodiment in which WDM is implemented, however, one fiber optic cable carries multiple data signals, in which case as few as one SMF or MMF may be used for each of the fiber optic cables 260, 270.

During operation, the multi-channel optoelectronic device 200 can receive N data-carrying electrical signals or channels 202 from the host 250, which can be any computing system capable of communication with the multi-channel optoelectronic device 200, for transmission as N data-carrying optical signals on to the parallel fibers 260. The N electrical signals may each comprise primary data. Each electrical signal is provided to one of N laser drivers 204. A driver 204 receiving an electrical data signal provides a primary data modulation signal to a corresponding optical transmitter 206, driving the transmitter to emit onto one of the fibers 260 a data-carrying optical signal representative of the information carried on the electrical data signal.

Each of the N optical transmitters comprises a light source having any suitable configuration, including, but not limited to, a distributed feedback (DFB) laser, a vertical cavity surface emitting laser (VCSEL), a cooled or uncooled externally modulated laser (EML), an EML with a wavelocker, a Fabry-Perot laser, an LED, and the like. In the present embodiment, the N optical transmitters 206 comprise an array of N VCSELs fabricated as a single semiconductor component although other arrangements, light sources and materials may alternately or additionally be used.

The multi-channel optoelectronic device 200 is also configured to receive N data-carrying optical signals from parallel ribbon fibers 270 using N optical receivers 208. Each of the optical receivers 208 may comprise, for example, a photodetector, a photodiode, an avalanche photodiode (APD), a positive-intrinsic-negative photodiode (PIN), and the like. In the present embodiment, the N receivers 208 comprise an array of N PINs fabricated on a single piece of Indium Phosphide, although other arrangements, receivers and materials may alternately or additionally be used.

The N receivers 208 transform received optical signals into electrical signals. The post-amplifiers 210 amplify each electrical signal and provide N amplified signals 212 to the host 250. In other words, the multi-channel optoelectronic device can receive N optical signals, transform every one into an electrical signal, amplify each signal, and provide N amplified electrical signals representative of the N received optical signals to the host. The N received signals typically comprise primary data.

Although the present embodiment implements the same number (e.g., N) of drivers, transmitters, receivers and post-amplifiers as there are channels, in another embodiment additional components (e.g., drivers, transmitters, receivers, and/or post-amplifiers) can be implemented to provide spare channels in the event that one or more components fail, as disclosed in U.S. patent application Ser. No. 11/952,832 entitled PARALLEL HIGH-SPEED COMMUNICATION LINKS WITH REDUNDANT CHANNEL ARCHITECTURES, filed Dec. 7, 2007, which application is herein incorporated by reference in its entirety. In this case, the optoelectronic device 200 may additionally include one or more electrical multiplexers and demultiplexers and/or other circuitry to route data through operational channels.

The behavior of the drivers 204, transmitters 206, receivers 208 and post amplifiers 210 may vary dynamically due to a number of factors. For example, temperature changes, power fluctuations, feedback conditions, and aging effects may each affect the performance of these components. Accordingly, the optoelectronic device 200 further includes a controller 230, which can evaluate conditions pertinent to optoelectronic device operation, such as temperature, voltage or bias current, and receive information from the drivers 204, transmitters 206, receivers 208 and post amplifiers 210, represented by arrows 212, 214, 216 and 218, respectively. This allows the controller 230 to optimize the dynamically varying performance, and additionally detect when there is a loss of signal. Specifically, the control module 230 may optimize the operation of the optoelectronic device 200 by adjusting settings on each of the drivers 204 and/or post amplifiers 210 individually. These settings adjustments can be intermittent and are generally only made when temperature or voltage or other low frequency changes so warrant. According to one embodiment, these settings adjustments may occur in response to status data received from a second optoelectronic device with which the first optoelectronic device 200 communicates.

Alternately or additionally, the controller 230 may be configured to transition operation of the N transmitters 206 between a low transmit power mode and a normal transmit power mode depending on potential eye exposure to emitted optical signals. In one embodiment, this may include the controller 230 adjusting the transmitter bias currents of the transmitters 206, described in greater detail below. These transitions may occur in response to status data received from the second optoelectronic device.

The controller 230 may have access to a persistent memory 220, which in one embodiment, is an electrically erasable programmable read-only memory (EEPROM). Persistent memory 220 may also be any other nonvolatile memory source. The persistent memory 220 and the controller may be packaged together in the same package or in different packages without restriction. Data may be exchanged between the controller 230 and the host 250 using an appropriate interface 222, such as $I^2C$, MDIO, SPI, or the like without restriction. Although not required, in one embodiment the controller 230 can include both an analog portion 232 and a digital portion 234 that together allow the controller to implement logic digitally, while still largely interfacing with the rest of the optoelectronic device 200 using analog signals.

The controller senses and retrieves data relating to the operation of the multi-channel optoelectronic device 200. In particular, the controller is configured to sense and retrieve data relating to each of the N transmit channels and/or the N receive channels. For instance, the controller may retrieve digital values for the transmitter bias current for each of the N transmitters 206. These digital values may be supplied to N digital to analog converters (DACs) which use the digital values to generate an analog transmitter bias current for each of the N transmitters 206. Upon receipt of optical signals by the N receivers 208, the controller may also detect the receiver bias current in each of the N receivers 208.

According to one embodiment of the invention, the controller 230 controls the transmit power of the N transmitters 206 by altering the transmitter bias current for each of the transmitters. This may done to compensate for aging effects. Alternately or additionally, if the controller 230 receives status data from the second device indicating it is safe to operate above an eye safety limit, it supplies the regular transmitter bias current to each of the transmitters 206, enabling the device 200 to operate in a normal transmit power mode. In the normal transmit power mode, the aggregate optical output power of the device 200 is above a nominal or predetermined eye safety limit. If the controller 230 does not receive status data indicating it is safe to operate above the eye safety limit, it operates in a low transmit power mode. In the low transmit power mode, the aggregate optical output power of the device 200 is at or below the nominal or predetermined eye safety limit. The low transmit power mode is achieved in one embodiment by reducing the transmitter bias current supplied to each of the transmitters 206 or in another embodiment by operating the regular transmitter bias currents at a low duty cycle.

Figure 3:
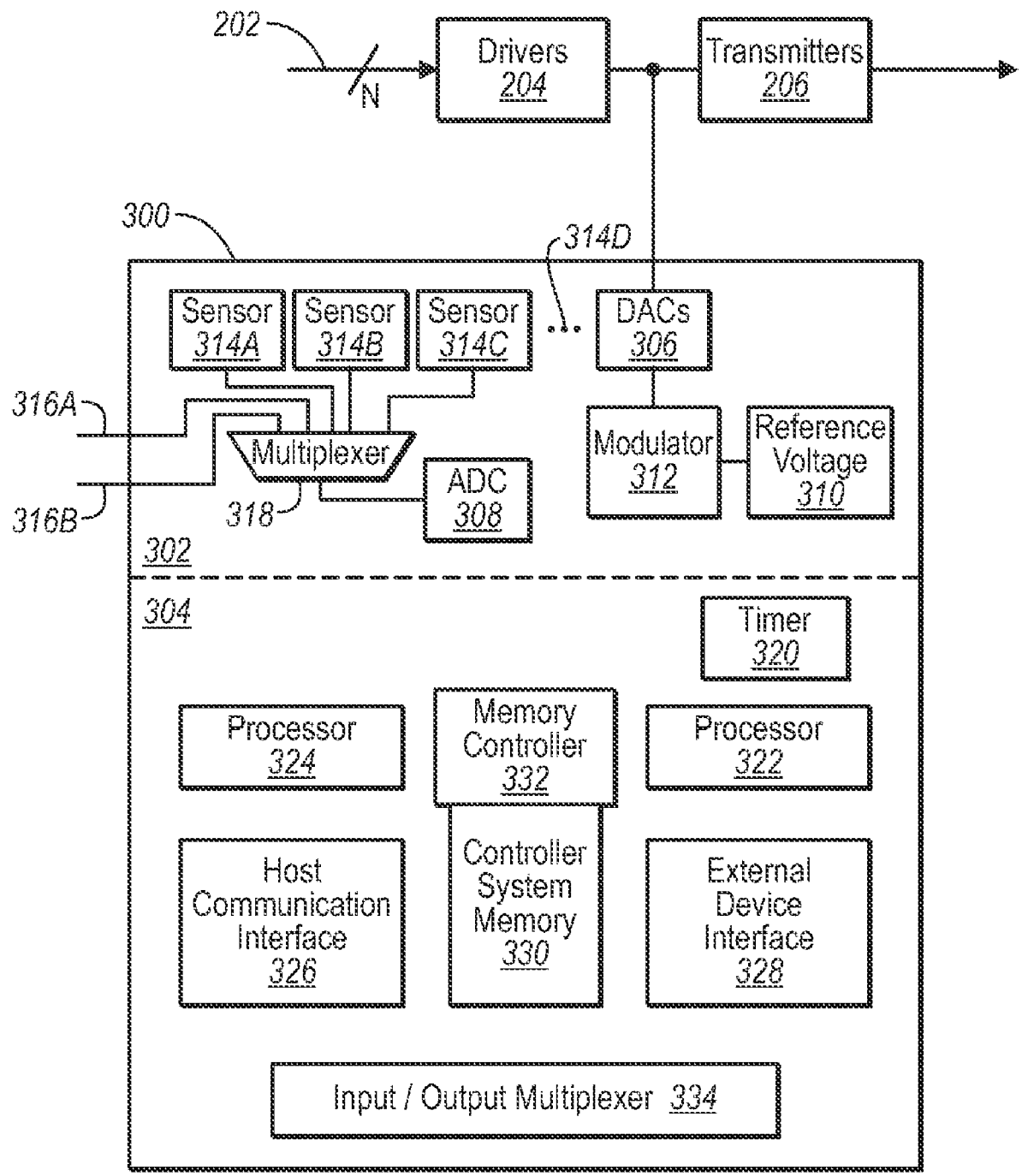
FIG. 3 schematically illustrates an example of a controller that can be used in the optoelectronic devices of FIGS. 1 and 2.

FIG. 3 schematically illustrates an example configuration 300 of the controllers 111, 121 of FIG. 1 and/or controller 230 of FIG. 2 in further detail. The controller 300 includes an analog portion 302 that represents an example of the analog portion 232 of FIG. 2, and a digital portion 304 that represents an example of the digital portion 234 of FIG. 2. For example, the analog portion 302 may contain digital to analog converters (DACs) 306, analog to digital converters (ADCs) 308, high speed comparators (e.g., for event detection), voltage-based reset generators, voltage regulators, voltage references 310, clock generator, modulator 312, and other analog components. The analog portion 302 may also include sensors 314A, 314B, 314C amongst potentially others as represented by the horizontal ellipses 314D. Each of these sensors may be responsible for measuring diagnostic data including environmental and/or operational parameters that may be measured from the control module 300 such as, for example supply voltage and optoelectronic device temperature. The control module may also receive external analog or digital signals from other components within the optoelectronic device. Two externals lines 316A and 316B are illustrated for receiving such external analog signals although there may be many of such lines. According to one embodiment of the invention, N external lines like 316A and 316B receive external analog signals from the N receivers 108 representing the receiver bias current in each of the receivers.

The internal sensors 314A through 314D may generate analog signals that represent the measured values. In addition, the externally provided signals 316A, 316B may also be analog signals. In this case, the analog signals are converted to digital signals so as to be available to the digital portion 304 of the controller 300 for further processing. Of course, each analog parameter value may have its own ADC. However, to preserve chip space, each signal may be periodically sampled in a round robin fashion using a single ADC such as the illustrated ADC 308. In this case, each analog value may be provided to a multiplexer 318, which selects in a round robin fashion, one of the analog signals at a time for sampling by the ADC 308. Alternatively, multiplexer 318 may be programmed to allow for any order of analog signals to be sampled by the ADC 308.

The digital portion 304 of the control module 300 may include a timer module 320 that provides various timing signals used by the digital portion 304. Such timing signals may include, for example, programmable processor times. The timer module 320 may also act as a watchdog timer.

Two general purpose processors 322 and 324 are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 322 and 324 are each a 16-bit processor and may be identically structured. The precise structure of the instruction set is not important to the principles of the present invention as the instruction set may be optimized around a particular hardware environment, and as the precise hardware environment is not important to the principles of the present invention.

A host communication interface 326 is used to communicate with the host 150 using, for example, serial data (SDA) and serial clock (SCL) lines of an I²C interface, although other interfaces may be used. The external device interface 328 is used to communicate with other modules within the multi-channel optoelectronic device 300 such as the post-amplifier 102, the laser driver 103, or the persistent memory 106.

The internal controller system memory 330 (not to be confused with the external persistent memory 220) may be random access memory (RAM) or nonvolatile memory. While system memory 330 may be RAM, it may also be a processor, register, flip-flop or other memory device. The memory controller 332 shares access to the controller system memory 330 amongst each of the processors 324, 322 and with the host communication interface 326 and the external device interface 328.

An input/output multiplexer 334 multiplexes the various input/output pins of the controller 300 to the various components within the controller 300. This enables different components to dynamically assign pins in accordance with the then-existing operational circumstances of the controller 300. Accordingly, there may be more input/output nodes within the controller 300 than there are pins available on the controller 300, thereby reducing the footprint of the controller 300.

Returning to FIG. 1, in a typical embodiment, a multi-channel optical link, such as the link 150 of FIG. 1, has three transmit power modes, controlled by the controllers of optoelectronic devices A and B: 1) off, 2) low, and 3) normal. In the normal transmit power mode both the main communication links and the status link can be established. In other words, primary data and status data may be simultaneously transmitted. The optical link budget of the multi-channel optical link 150 is usually above the nominal eye safety limit in the normal transmit power mode in either direction of the link (e.g., A-to-B and B-to-A). The low transmit power mode is such that under all conditions the total transmit output power in either direction of the link is under the nominal eye safety limit. In this mode, the link budget may be too low for the main communication links to be established or the main communication links may be weak. However, because the status link is conveyed at a low data rate, it requires a much lower link budget to permit status link operation. Accordingly, the low transmit power mode has sufficient link budget to permit status link operation.

According to embodiments of the present invention, a status link may be established over two or more communication channels, either by itself or in combination with two or more main communication links, to provide a robust and redundant status link. The status link advantageously enables the elimination of eye safety limit restrictions on transmit power in certain circumstances, the transmission of status data regarding communication channels between the optoelectronic devices, and the like or any combination thereof. For a given direction A-to-B or B-to-A, primary data signals of the main communication links are generated when a high frequency primary data modulation signal, $I_{mod}$, generated by each of the N drivers 204 from the N input electrical signals 202, modulates a laser bias current, $I_{bias}$, output by one of N DACs 306. The modulated bias current drives a transmitter to produce an optical signal representative of the primary data from the input electrical signal.

In order to establish a status link on a channel, $I_{bias}$ for the channel (more particularly, $I_{bias}$ for the transmitter of the channel) is effectively modulated with a low frequency status link modulation signal, $I_{mod\_status}$, representative of status data prior to being provided to a transmitter. In low transmit power mode and other embodiments, a status link may be established by itself without a main communication link by providing the status link modulated $I_{bias}$ to a transmitter which emits an optical signal representative of the status data. In normal transmit power mode and other embodiments, a status link may be established in combination with a main communication link by further modulating the status link modulated $I_{bias}$ with $I_{mod}$ and providing the resulting signal to a transmitter, which emits an optical signal representative of both the status data and the primary data of the main communication link. While establishing the status link on all of the N channels in a given direction (e.g., A-to-B or B-to-A) provides the greatest failure tolerance, establishing the status link on as few as two of the N channels still provides some failure tolerance. Hence, the principles of the present invention apply so long as the status link is established on two or more of the channels. In the event that the status link is established on fewer than all N of the channels in a given direction, a sending and receiving optoelectronic device are configured to establish the status link over predetermined channels. In this manner, the optoelectronic device receiving the status data can detect the status data on the appropriate channels.

Figure 4:
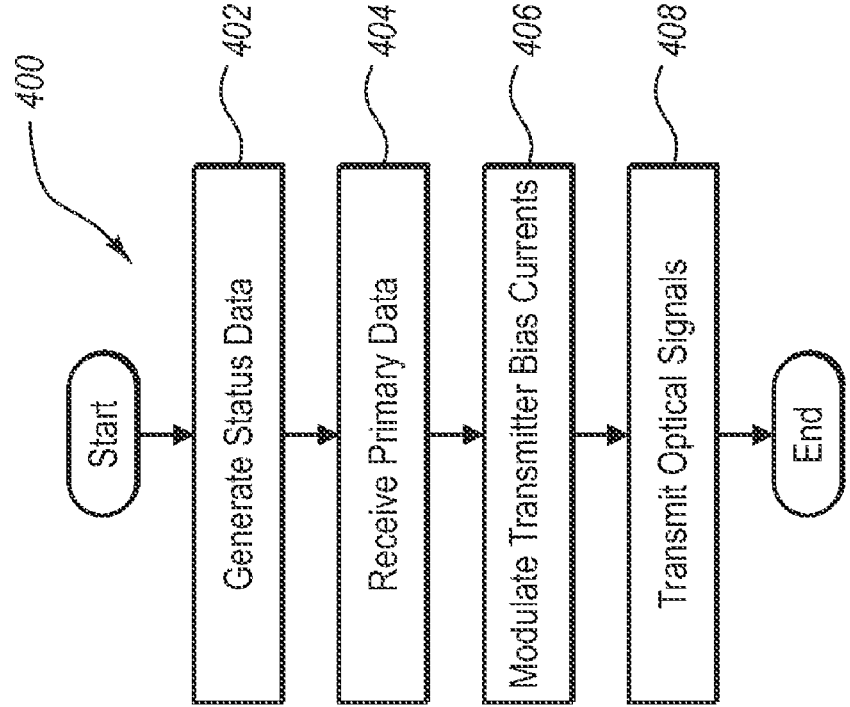
FIG. 4 depicts a method for effectively modulating transmitter bias currents with a status link modulation signal.

Referring now to FIGS. 1, 3 and 4, a method 400 is described for establishing a status link in the A-to-B direction of multi-channel communication link 150 of FIG. 1. One of skill in the art will appreciate, with the benefit of the present disclosure, that a status link in the B-to-A direction may similarly be established. The process 400 begins when controller A 111 generates 402 status data. Many times, the status data may be indicative of one or more conditions affecting the performance of multi-channel optical communication link 150; thus, controller A 111 may generate status data by monitoring various operational and/or environmental parameters of device A 110.

For instance, in one embodiment, controller A 111 of device A 110 may determine that one of the main communication links with device B 120 is no longer working. This may be due to a failed transmitter or receiver, for instance. If unused channels are available (e.g., an unused fiber in a set of parallel ribbon fibers or an unused wavelength in WDM applications), the controller 111 may generate status data instructing optoelectronic device B 120 to switch out the non-functional channel for an available functional channel. Embodiments of methods and systems for providing failure tolerance with spare channels and a redundant status link are described in greater detail in United States Patent Application entitled REDUNDANCY AND INTEROPERABILITY IN MULTI-CHANNEL OPTOELECTRONIC DEVICES, filed Feb. 28, 2007, which application is herein incorporated by reference in its entirety.

Alternately or additionally, controller A 111 may determine that the optical signal received by one of optoelectronic device A's N receivers 112 is progressively attenuating, which could compromise the integrity of the main communication link associated with the receiver in question. The signal may be progressively attenuating due to aging and/or other degradation effects in one of the N transmitters of optoelectronic device B 120 and/or in one of the corresponding optical fibers 140. In this case, controller A 111 may generate status data instructing optoelectronic device B 120 (or more particularly, instructing controller B 121) to adjust the transmit power of the transmitter in question to compensate for the attenuation. One embodiment of a method for compensating for degradation effects is discussed in greater detail below with respect to FIG. 10.

Alternatively or additionally, controller A 111 may determine whether optical signals emitted by the transmitters of device A and/or the transmitters of device B are potentially exposed to view. If controller A 111 determines that the optical signals are not potentially exposed to view (based on receiver bias currents of the N receivers 114 in one embodiment), it may generate 402 status data indicating it is safe for device B 120 to operate in the normal transmit power mode. Controller A 111 may continue to generate 402 status data indicating it is safe to transmit at the normal transmit power mode until it is unsafe to do so. In this embodiment, once controller B 121 no longer receives status data indicating it is safe to operate at the normal transmit mode, it can then transition to the low transmit power mode to maintain eye safety.

Alternately or additionally, controller A 111 may generate default status data which is constantly sent to optoelectronic device B 120 unless other status data has been generated. While specific types of status data have just been disclosed, those of skill in the art will recognize that other status data may alternately or additionally be generated as desired.

If the status link is combined with two or more main communication links (e.g., in the normal transmit power mode), each of the N drivers of device A 110 receives 404 a primary data signal used to establish a main communication link over one of the N channels. The primary data signals may be transformed into optical signals according to methods known in the art, an example of which is briefly described in the remainder of this paragraph. In a typical embodiment, the primary data signals may be line coded using 8B/10B, 64B/66B or some other encoding scheme designed to inhibit undesirably long strings of 0 bits or 1 bits which may otherwise disrupt system operation. The line coding may occur in the drivers, where further conditioning of the primary data signals (e.g., waveform shaping or the like) may optionally occur, ultimately resulting in N primary data modulation signals. N digital to analog converters (DACs) in controller A 111 each provides a transmitter bias current to be modulated by one of the N primary data modulation signals. Each of the N DACs uses a digital transmitter bias current value supplied by a processor of controller A 111 and a common reference voltage to convert the digital transmitter bias current value into a transmitter bias current. The resulting N transmitter bias currents provide sufficient current to each of the N transmitters for the lazing function of the N transmitters 112. Each of the N transmitter bias currents are modulated by a different primary data modulation signal and the primary-data modulated signals are used to drive the N transmitters 112, producing N optical signals.

If the status link is established by itself not in combination with two or more main communication links (e.g., in the low transmit power mode), the N drivers may not receive 704 primary data signals in which case N main communication links are not established. Instead, only a redundant status link is established. Two or more of the N DACs still combine digital transmitter bias current values from a processor of controller A 111 with a signal from a common reference voltage in order to provide transmitter bias currents to two or more transmitters. In this case, the transmitter bias currents are not modulated by the primary data modulation signals prior to being provided to the two or more transmitters.

In one embodiment, when the low transmit power mode is achieved by operating the transmitter bias currents at a low duty cycle (but at regular transmitter bias current levels), the status link is only operational during the portion of the duty cycle when the transmitter bias currents are at regular levels.

To enable the advantages of the present invention, two or more of the N transmitter bias currents are effectively modulated 406 with a low frequency status link modulation signal prior to being modulated by primary data modulation signals. According to one embodiment, this is done by modulating the signal from a common reference voltage 310, as illustrated in FIG. 3. The status data generated by the processor of controller A 111 is provided to a modulator 312, which generates the status link modulation signal. The modulator 312 receives the signal supplied by the common reference voltage 310 and modulates it with the status link modulation signal. The status-link modulated common reference voltage signal is provided to the N DACs 306, which use the digital transmitter bias current values received from the processor and the status-link modulated common reference voltage signal to create status-link modulated transmitter bias currents.

In order to avoid interfering with the main communication links, the modulator 312 modulates the signal from the common reference voltage 310 with a low frequency to ensure that the status link modulation bandwidth is below a high pass cut-off frequency of the main links. Although not illustrated, the N transmitter bias currents (whether status-link modulated or not) may be low pass filtered to provide stable currents for the main communication links, which is consistent with keeping the status link modulation bandwidth below the high pass cut-off frequency of the main links. Those of skill in the art will appreciate, with the benefit of the present disclosure, that the common reference voltage signal may be modulated for at least two of the N DACs to provide some failure tolerance, while modulating the reference voltage signal for three or more of the N DACs provides increasingly higher failure tolerance.

In another embodiment of the invention, rather than modulating the common reference voltage signal for the N transmitter bias currents with the status link modulation signal, the processor of controller A 111 modulates the digital transmitter bias current values for two or more of the N transmitters with the status link modulation signal. In this embodiment, the processor of controller A 111 uses previously generated status data to generate a status link modulation signal. Within controller A 111, the status link modulation signal is combined with two or more of the N digital transmitter bias current values to produce status-link modulated digital transmitter bias current values. Accordingly, the status-link modulated digital transmitter bias current values are provided to the DACs 306 and the DACs produce status-link modulated transmitter bias currents for modulation by the primary data modulation signals. If the status link modulation signal is combined with less than all N of the digital transmitter bias current values, the remaining digital transmitter bias current values are utilized as-is to produce regular transmitter bias currents. As with the previous embodiment, failure tolerance increases as the number of status-link modulated transmitter bias currents increases.

After two or more of the N transmitter bias currents have been status-link modulated, each of the status-link modulated transmitter bias currents (and regular transmitter bias currents, if any) is provided to a different transmitter. When the status link is combined with two or more main communication links, each of the transmitter bias currents (status-link modulated and regular) is additionally modulated by a different primary data modulation signal. Due to the effective modulation of two or more of the transmitter bias currents with the status link modulation signal, two or more of the transmitters 212 emit 408 optical data signals representative of the status data. The emitted optical signals may also be representative of primary data if the status link is combined with two or more main communication links.

According to the method 400 of FIG. 4, the status link may be established over two or more channels. Advantageously, the status link may be established by itself or with the main communication links in a manner that does not corrupt the main communication links. Further, the established status link is redundant and robust when established over multiple channels. When every one of the N transmitter bias currents are effectively modulated with the status data, the status link is the most redundant and robust. Indeed, in this case N-1 channels can fail before the status link fails. This means that under most failure scenarios (e.g., at most N-1 of the N main communication links have failed), the status link can be used to reconfigure the main communication links.

Figure 5:
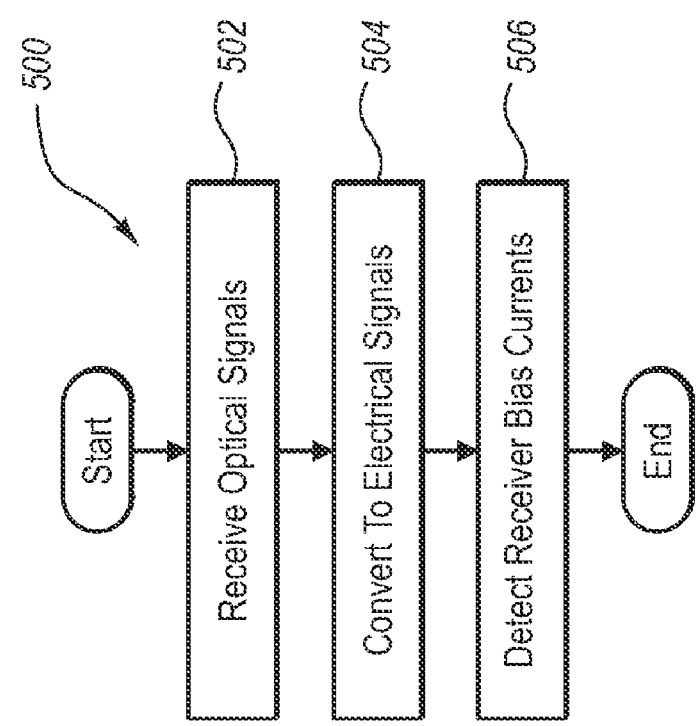
FIG. 5 illustrates a method for detecting a status link modulation signal by monitoring receiver bias currents.

With reference now to FIGS. 1, 3 and 5, an example method 500 is described for detecting a status link at device B 120 in the A-to-B direction of multi-channel communication link 150 of FIG. 1. Those skilled in the art will appreciate, with the benefit of the present disclosure, that a status link in the B-to-A direction may similarly be detected. The process 500 begins after optoelectronic device A 110 effectively applies a status link modulation signal to two or more transmitter bias currents to encode status data with primary data and optically transmits the status data and primary data to optoelectronic device B 120. The status data may be recovered by monitoring aspects of the received signals since the status data controls the low frequency intensity modulation of the received optical data signals.

In a typical embodiment, optoelectronic device B 120 receives 502 a total of N optical signals. However, if one or more of the main communication channels is not functioning or not in use for any reason, optoelectronic device B 120 may receive 502 less than a total of N optical signals, in which case the status link can be used in reestablishing the nonfunctional or unused communication channel(s).

According to embodiments of the invention, two or more of the N optical signals include status data. The N optical signals may additionally include primary data. Either way, the N optical signals are received by the N receivers 122, each of which converts 504 a different optical signal to an electrical signal. It is contemplated that when the status link is combined with two or more main communication links, the status link modulation signal is such that it does not interfere with subsequent processing of any of the N main communication links with which the status link may have been combined. Accordingly, the N electrical signals, whether some or all of the signals comprise both primary data and status data, may be provided to the N post amplifiers of device B 120 for further processing without demodulating the status data from the electrical signals.

The N receivers 122 may comprise photodetectors such as PINs, APDs, or the like. Each of the N receivers has a power supply that can source diode bias current, also referred to as "receiver bias current." In one embodiment, a common power supply is shared by all N receivers 122. The reception by the receivers 122 of optical signals including status data changes the receiver bias currents. Receivers which receive optical signals including both primary data and status data will be referred to as "status link receivers." The receiver bias currents provided by status link receivers will be referred to as "status-link modulated receiver bias currents." Accordingly, the status link modulation is monitored by detecting 506 the status-link modulated receiver bias currents of the status link receivers. Receiver bias currents for any remaining receivers 122 may also be detected, but the status-link modulated receiver bias currents are the ones primarily used in monitoring the status link modulation.

In one embodiment of the invention, the status-link modulated receiver bias currents are detected by returning them to a common point, such as a common power supply. If all N channels include status data, then N status-link modulated receiver bias currents are returned to the common power supply. If only two or more (but less than N) channels include status data, then only two or more status-link modulated receiver bias currents are returned to the common power supply. In either case, the total supply current of the power supply may be detected using one or more sensors. In an optoelectronic device having a controller 300 described above, the total supply current may be detected using one or more of the external lines 316A and 316B. By detecting the total supply current of the power supply to which the status-link modulated receiver bias currents are returned, the status data may be extracted from the status-link modulated receiver bias currents.

In another embodiment of the invention, status data is extracted from status-link modulated receiver bias currents by detecting status-link modulated receiver bias current values in digital form in controller B 121. Although not required in all embodiments of the invention, the present embodiment of the invention implements digital monitor and control methods with controller B, which may correspond to the controller 300 of FIG. 3 in one embodiment. In this embodiment, status-link modulated receiver bias currents can be converted by analog to digital converters (ADCs) 308 into digital status-link modulated receiver bias current values. Alternately, one ADC 308 could be used with an analog multiplexer to create one digital multiplexed status-link modulated receiver bias current value. In either case, the status-link modulated receiver bias currents can be monitored by a processor of controller B 121, which obtains digital status-link modulated receiver bias current values from the ADCs 308. The status data may be extracted by the processor from the digital status-link modulated receiver bias current values.

Any one of various modulation techniques may be used to effectively apply the status link modulation signal to two or more transmitter bias currents. In one embodiment, low frequency amplitude modulation may be applied, as described below with respect to FIGS. 6A-7D. Alternately or additionally, other modulation techniques may be applied.

Now with regard to FIGS. 6A-7, various plots are illustrated, depicting one modulation technique which may be used in applying the status link modulation signal to two or more transmitter bias currents. While low frequency amplitude modulation is the technique used in the present embodiment, other modulation techniques may be used so long as they do not interfere with subsequent processing of the primary data signals received by the receivers. The low frequency amplitude modulation of the present embodiment does not interfere with subsequent processing of the primary data signals because the degree of amplitude modulation occurring on the transmitter bias currents is not significant enough to interfere with subsequent processing but is significant enough to be detected by a sensor or controller. In addition, the frequency of the status link modulation function is much smaller than the frequency of the primary data signal in order to keep the status link modulation bandwidth below the high pass cut-off frequency of the main communication link.

In particular, FIG. 6A illustrates a transmitter bias current, $I_{bias}$, supplied to a transmitter to provide sufficient current for the lazing function of the transmitter. The vertical axis 602 represents transmitter bias current while the horizontal axis 604 represents time. The transmitter bias current is a DC current conventionally held at a relatively constant value 610 over time. The value of the bias current $I_{bias}$ is typically chosen to be above some minimum threshold current (not shown), below which a minimal amount of light is emitted by the transmitter. A current in amounts greater than the threshold current produces a relatively greater amount of lazing action by the transmitter, corresponding to an increased amount of light. $I_{bias}$ produces an acceptable predetermined average amount of emitted light in the emitted optical signal of the transmitter. While $I_{bias}$ is held at a constant value in FIG. 6A, it may be desirable to slightly increase or decrease $I_{bias}$ over time in response to changing temperatures, aging effects in the transmitter and other factors.

An optoelectronic device transforms a primary data electrical signal to an optical signal for transmission over optical fiber. As already explained above, this is typically done by modulating $I_{bias}$ with the primary data modulation signal, $I_{mod}$, representative of the primary data. $I_{mod}$ is configured to modify the transmitter bias current to provide relatively more or less current to the transmitter, thereby increasing or decreasing the transmitter power above and below the average light level. Modulation of the transmitter power, and hence its optical output, above and below the average light level in this manner produces respectively a high light level logic "1" and low light level logic "0" in optical format, thereby enabling the transmitter to optically produce a stream of digital data.

Figure 7A:
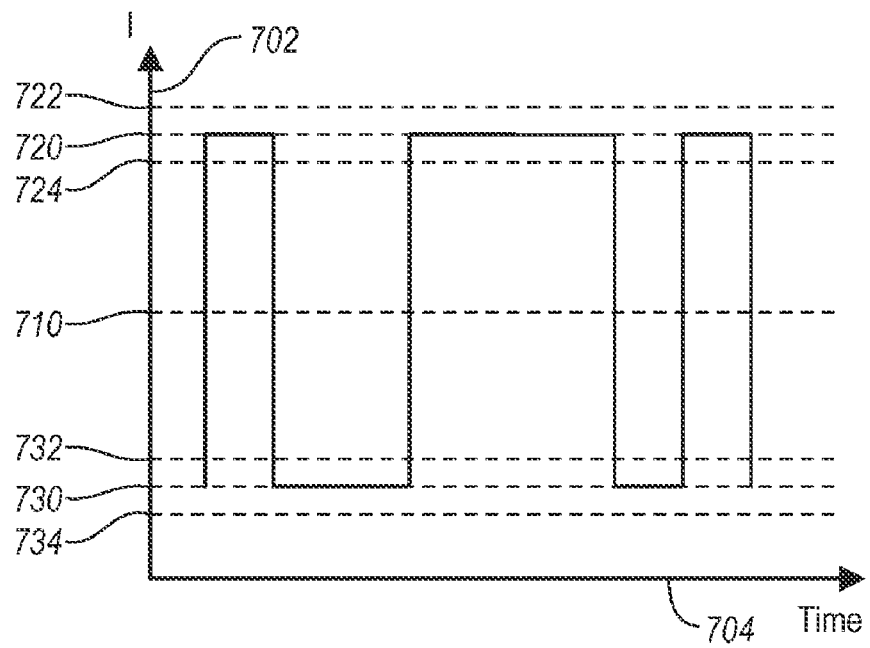
FIGS. 7A-7D illustrate exemplary plots of various modulation schemes.

FIG. 7A represents an example plot of an electrical signal resulting from the modulation of $I_{bias}$ with $I_{mod}$. In the present embodiment, the primary data conveyed by the signal is represented by a binary bit stream: 10011101. The bit stream shown is arbitrary and used solely for the purpose of illustrating aspects of the invention. As shown, the vertical axis 702 represents current while the horizontal axis 704 represents time. The bias current 710 is increased or decreased by $I_{mod}$ to represent either a logic value "1" or a logic value "0." Absent status-link modulation of $I_{bias}$, the signal varies between a high current level 720 (logic value "1") and a low current level 730 (logic value "0"). However, the operation of the transmitters, receivers and subsequent signal processing of the present invention may all operate as desired if the signal ranges between current levels 722 and 724 for logic value "1" and between current levels 732 and 734 for logic value "0."

FIG. 6B illustrates a status-link modulated transmitter bias current. As previously described, the transmitter bias current may be effectively modulated by modulating a reference voltage or a digital transmitter bias current value with the status link modulation signal. In the present embodiment, the status data conveyed by status-link modulated $I_{bias}$ is represented by an arbitrarily selected binary bit stream: 10. According to the present embodiment, both the amplitude and frequency of the status-link modulation are much smaller than that of the primary data modulation so as not to interfere with the primary data signal. In FIGS. 6A-6D, identical reference numbers identify identical elements.

The bias current of FIG. 6B is no longer a constant bias current as in FIG. 6A, but is modulated with a low frequency status link modulation signal to convey status data simultaneously with the primary data. For instance, sample 606 is a high bias current, $I_{high\_bias}$, representing a logic value "1" and sample 608 is a low bias current, $I_{low\_bias}$, representing a logic value "0." In the present embodiment, $I_{high\_bias}$ corresponds to an increase in the normal $I_{bias}$ while $I_{low\_bias}$ corresponds to a decrease in the normal $I_{bias}$. FIGS. 6C and 6D convey the same status data as FIG. 6B (e.g., a 1 bit followed by a 0 bit). In FIG. 6C, however, $I_{high\_bias}$ corresponds to an increase in the normal $I_{bias}$ while $I_{low\_bias}$ corresponds to no change to the normal $I_{bias}$. In FIG. 6D, $I_{low\_bias}$ corresponds to a decrease in the normal $I_{bias}$ while $I_{high\_bias}$ corresponds to no change to the normal $I_{bias}$.

Figure 7B:
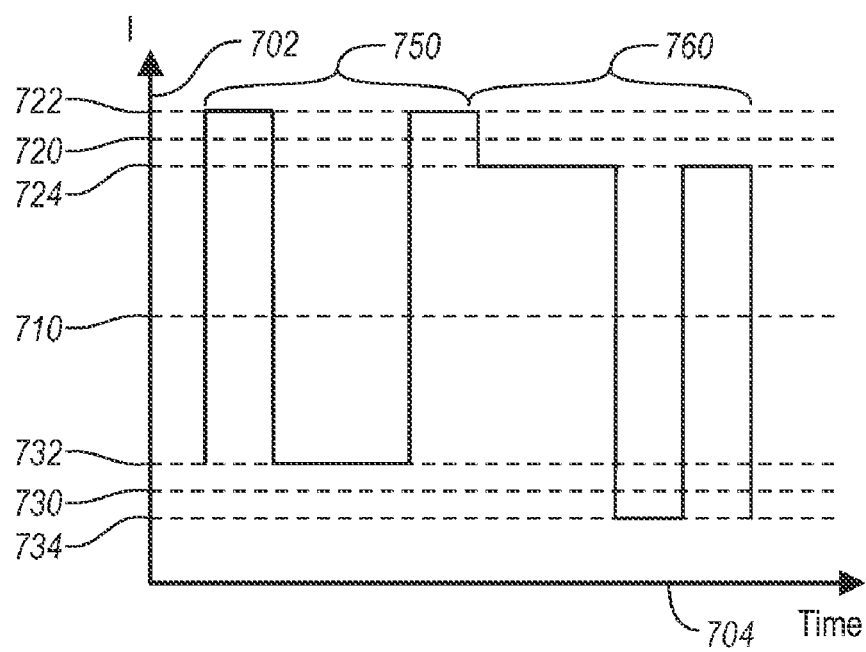

FIG. 7B represents an example plot of an electrical signal resulting from the modulation of the status-link modulated transmitter bias current of FIG. 6B with the 10011101 primary data modulation signal. In FIGS. 7A-7D, identical reference numbers identify identical elements. As can be seen in FIG. 7B, the upper and lower current levels of the signal are increased to levels 722 and 732, respectively, for the samples 750. For samples 760, the upper and lower current levels of the signal are decreased to levels 724 and 734, respectively.

Figure 7C:
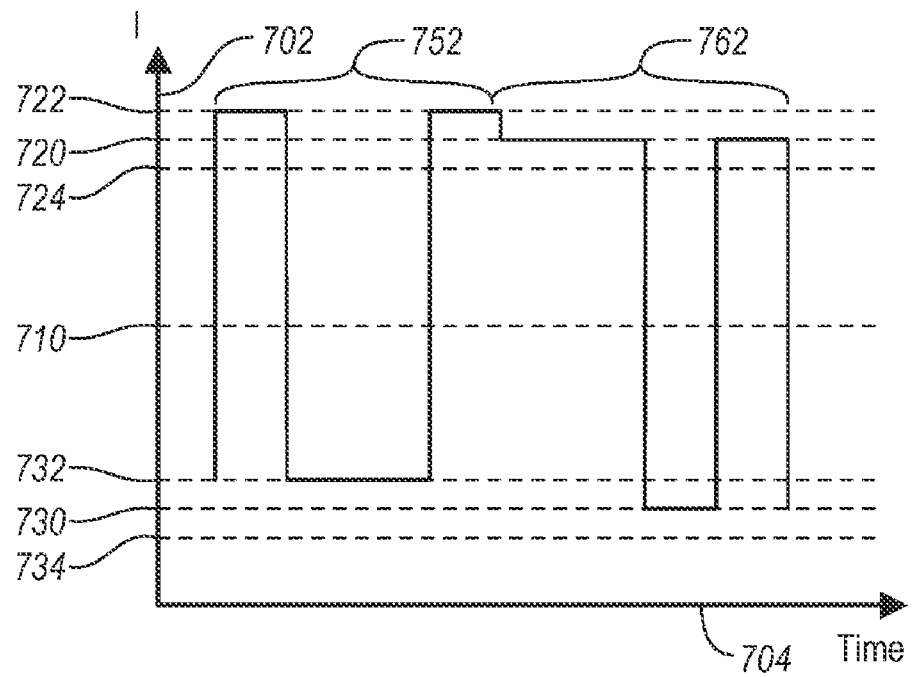

FIG. 7C represents an example plot of an electrical signal resulting from the modulation of the status-link modulated transmitter bias current of FIG. 6C with the primary data modulation signal. When the status-link modulated transmitter bias current is created by increasing the normal $I_{bias}$ to obtain $I_{high\_bias}$ and returning to the normal $I_{bias}$ to obtain $I_{low\_bias}$, the upper and lower current levels of the resulting signal are respectively increased to levels 722 and 732 for samples 752, while the upper and lower current levels of the signal remain unchanged at levels 720 and 730, respectively, for samples 762.

Figure 7D:
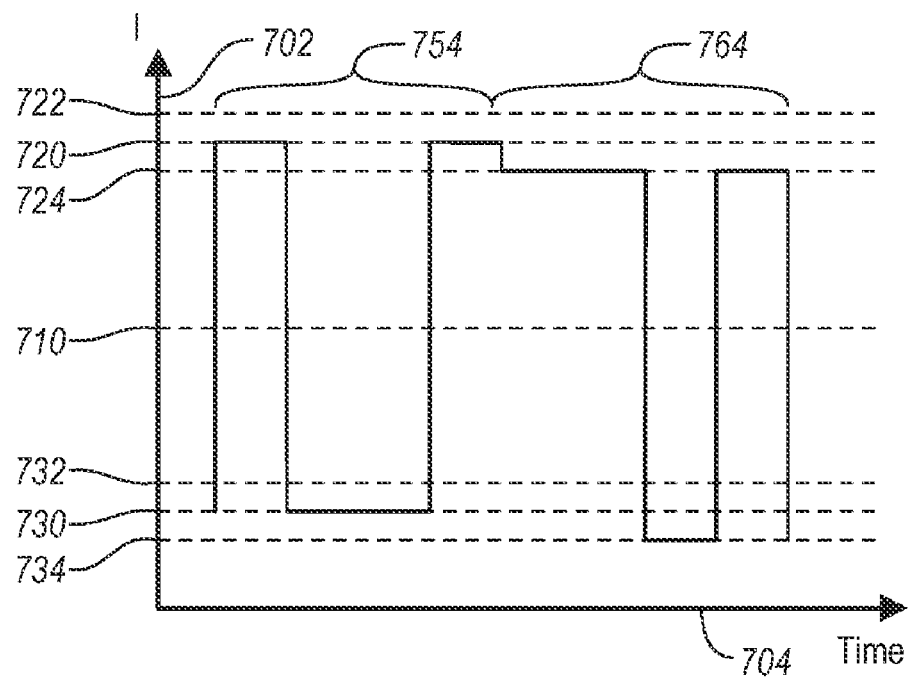

FIG. 7D represents an example plot of an electrical signal resulting from the modulation of the status-link modulated transmitter bias current of FIG. 6D with the primary data modulation signal. When the status-link modulated transmitter bias current is created by decreasing the normal $I_{bias}$ to obtain $I_{low\_bias}$ and returning to the normal $I_{bias}$ to obtain $I_{high\_bias}$, the upper and lower current levels of the signal remain unchanged at levels 720 and 730 for samples 754, while the upper and lower current levels of the signal are decreased to levels 724 and 734 for samples 764.

Advantageously, the electrical signals of FIGS. 7B-7D convey both high frequency primary data (10011101) and low frequency status data (10). The optical signals emitted by a transmitter receiving the electrical signals of FIGS. 7B-7D as input will also convey both high frequency primary data and low frequency status data. In this manner, a status link can be efficiently established on two or more main communication channels between two optoelectronic devices without interfering with the main communication channels. When the optoelectronic devices communicate over multiple main communication channels, a redundant and robust status link can easily be established.

Figure 8:
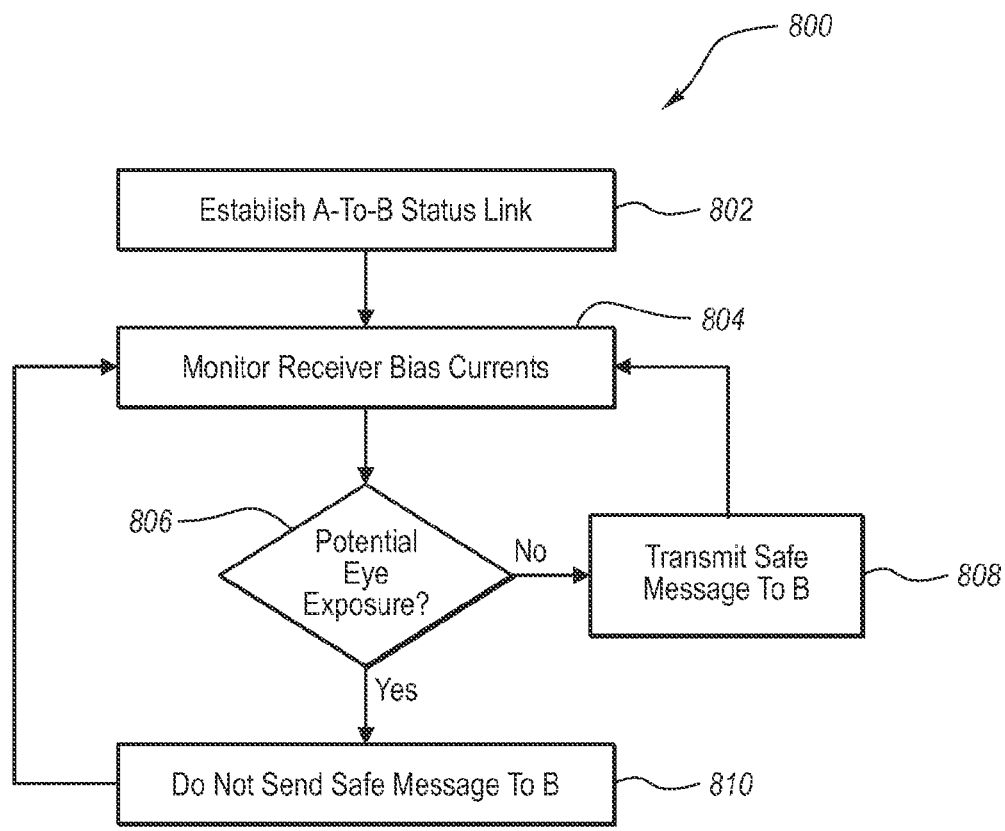
FIG. 8 depicts one perspective of a method for operating an optical communication link above nominal eye safety limits.
Figure 9:
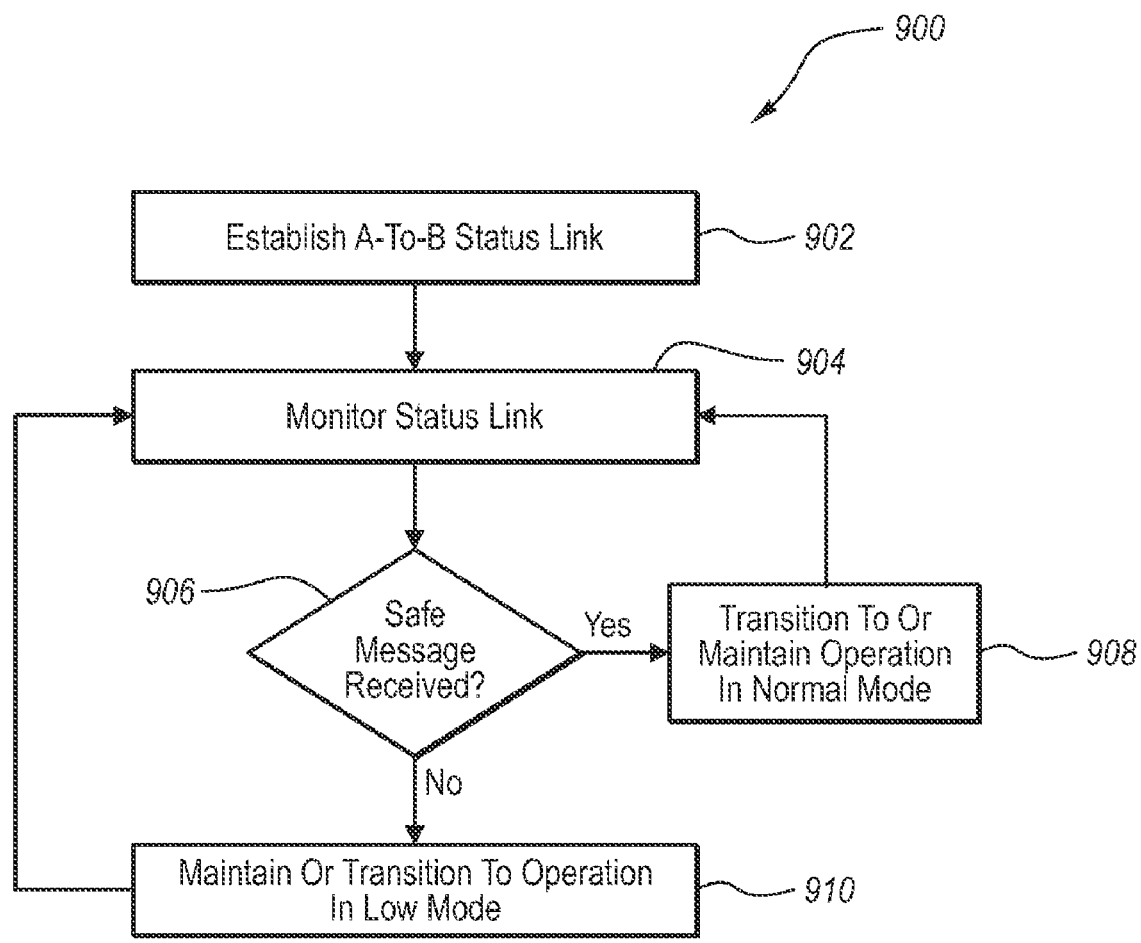
FIG. 9 depicts another perspective of a method for operating an optical communication link above nominal eye safety limits.

With reference now to FIGS. 1, 8 and 9, two segregable parts of an example method for operating optical communication link 150 above eye safety limits in the B-to-A direction of the link are discussed. Those of skill in the art will recognize, with the benefit of the present disclosure, that the method is equally applicable in the other direction (A-to-B), without restriction, and that only one direction is discussed for simplicity. FIG. 8 illustrates a method 800 from the perspective of optoelectronic device A 110 and FIG. 9 illustrates a method 900 from the perspective of optoelectronic device B 120.

The process 800 begins after controller A is powered on and controller A establishes 802 an A-to-B status link with controller B. In a typical embodiment, the status link is established while device A 110 is in the low transmit power mode. The status data transmitted over the status link may be generated by monitoring 804 the receiver bias current values for the receivers of device A 110. If the receiver bias current values indicate 806 that the optical signals in the B-to-A direction are not potentially exposed to view, controller A generates status data indicating it is safe to operate above eye safety limits. Stated another way, the status data may indicate it is safe for device B 120 to transmit optical signals at an aggregate transmit power that is greater than some predetermined limit. The status data is transmitted 808 to controller B using the A-to-B status link. Controller A monitors 804 the status of all receivers (e.g., by monitoring the receiver bias current values) at all times and continuously sends 808 the status data indicating it is safe to operate above eye safety limits to controller B as long as the receiver bias current values indicate that the optical signals in the B-to-A direction are not potentially exposed to view.

If the receiver bias current values indicate 806 that the optical signals in the B-to-A direction are potentially exposed to view, controller A does not generate and send 810 status data indicating it is safe to operate above eye safety limits to controller B. The optical signals in the B-to-A direction may be exposed for any of a number of reasons. For instance, the optical fiber(s) between the transmitters of device B 120 and the receivers of device A 110 may be inadvertently cut (e.g., by construction crews digging in the area in which the optical fiber(s) is laid, etc.). Alternately, a technician performing repairs or maintenance on the optical communication link may unplug the optical fiber(s) from the transmitters at device B 120 or from the receivers at device A 110. No matter the reason, controller A does not generate and send the status data indicating it is safe to operate above eye safety limits to controller B if it determines that the optical signals in the B-to-A direction are potentially exposed to view. Controller A continues to monitor 804 the status of all its receivers and not send 810 the status data indicating it is safe to operate above eye safety limits to controller B so long as the receiver bias current values indicate that the optical signals in the B-to-A direction are potentially exposed to view.

With reference now to FIG. 9, an example method 900 for operating an optical communication link in the B-to-A direction above eye safety limits is illustrated from the perspective of device B 120. The method 900 begins after controllers A and B are powered on and controller A establishes 902 an A-to-B status link with controller B. In a typical embodiment, the status link is established while controller B is in the low transmit power mode, although this is not required in all embodiments. Controller B monitors 904 the status link to determine whether or not it is safe to transition to (or maintain) operation in the normal transmit power mode. If controller B detects 906 the status data indicating it is safe to operate above eye safety limits in the status link, controller B transitions 908 to the normal transmit power mode. Controller B continues to monitor 904 the status link and maintains operation in the normal transmit power mode as long as it continues to receive the safe message in the status link.

If controller B does not detect 906 the status data indicating it is safe to operate above eye safety limits, (either because controller A is not sending it or because the A-to-B status link has been lost), controller B maintains 910 (or transitions to) the low transmit power mode. Controller B may not detect the status data indicating it is safe to operate above eye safety limits for any of a variety of reasons. For instance, if the link hardware in the A-to-B direction is open, the A-to-B status link fails and controller A cannot send the safe message to controller B. If the link hardware in the B-to-A direction is open, or the receiver bias currents of device A 110 otherwise indicate a fault condition (e.g., potentially exposed optical signals), the A-to-B status link does not fail, but controller A does not send the status data indicating it is safe to operate above eye safety limits. In both cases, controller B maintains 910 operation in the low transmit power mode (or transitions to the low transmit power mode if it was previously operating in the normal transmit power mode). Controller B continues to monitor 904 the status link and maintain 910 operation in the low transmit power mode as long is it does not receive the status data indicating it is safe to operate above eye safety limits from controller A.

Advantageously, embodiments of the present invention permit a multi-channel communication link to operate above maximum eye safety transmit power limitations by automatically applying the limitations on maximum transmit power only when optical signals are potentially exposed to view. This can be done by continuously sending status data indicating it is safe to operate above the eye safety limits over a status link so long as there are no conditions detected indicative of potential eye exposure. Because of the high reliability of the status link, it can be relied on to actively maintain eye safety in the optical communication link.

Figure 10:
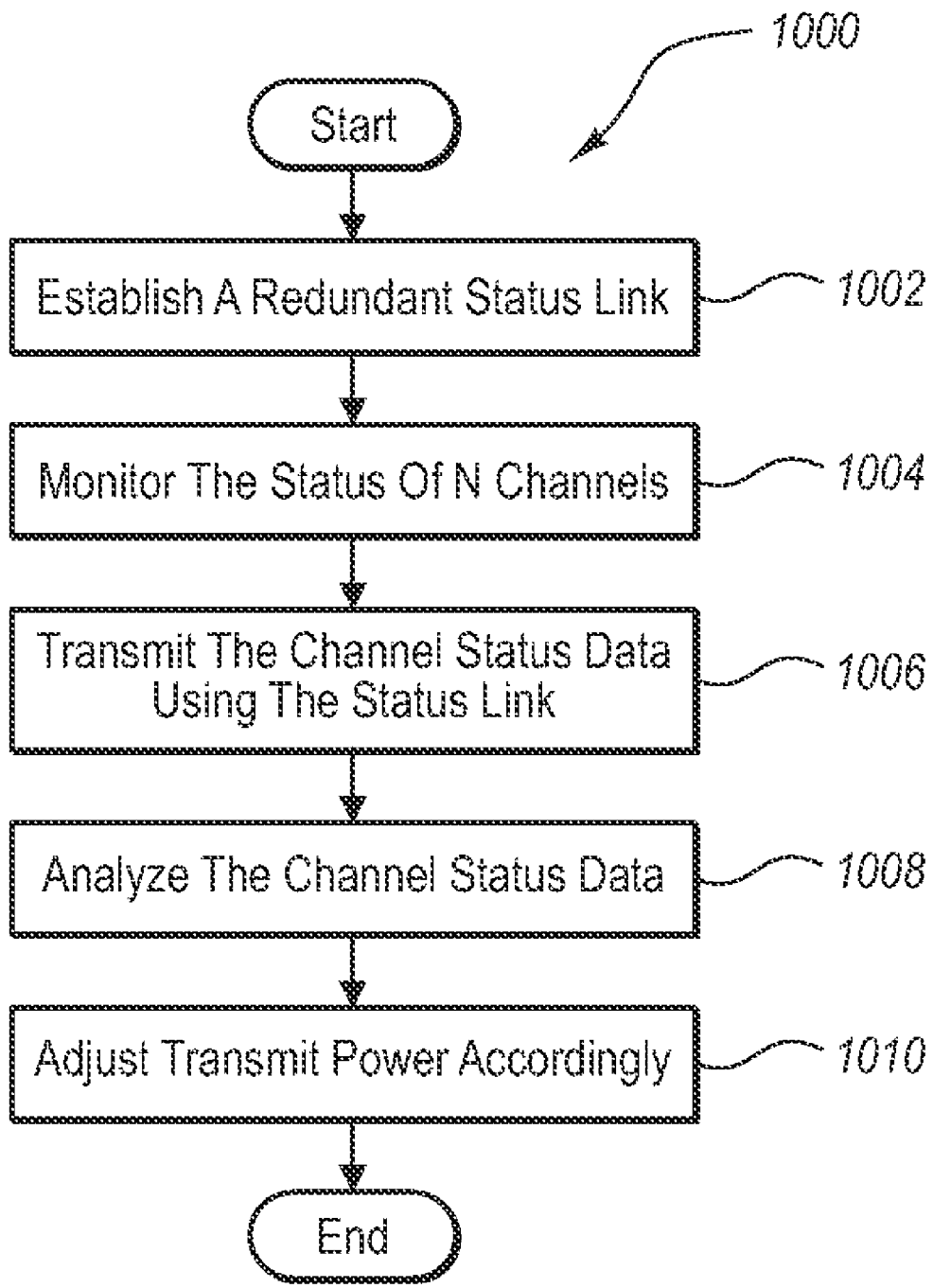
FIG. 10 depicts a method for using a status link to compensate for degradation effects affecting an optical communication link.

Alternately or additionally, embodiments of the invention may include a method 1000 for identifying degradation effects and adjusting transmit power in an optoelectronic device to compensate, as described with respect to FIGS. 1 and 10. The process 1000 begins after device A 110 and device B 120 are powered on and describes the use of an A-to-B status link to permit adjusting of the B-to-A transmit power. Those skilled in the art will recognize that the method is equally applicable when using a B-to-A status link to permit adjusting of the A-to-B transmit power.

After being powered on, controller A 111 establishes 1002 an A-to-B status link with controller B 121. The status data transmitted over the status link to controller B may be generated by monitoring 1004 the status of each of the N communication channels in the B-to-A direction, referred to herein as the "B-to-A channels". More particularly, controller A observes and records data indicative of the status of the B-to-A channels, which may be referred to herein as "B-to-A channel status data". For instance, digital receiver bias current values for the receivers 114 of device A 110 lower than some predetermined minimum level may indicate that corresponding transmitters of device B 120 need to be adjusted. Accordingly, the digital receiver bias current values for the receivers 114 of device A 110 may be obtained by detecting the receiver bias currents for the receivers and using one or more ADCs to convert the receiver bias currents into digital values. Controller A 111 may record other channel status data for the B-to-A channels in place of or in addition to the digital receiver bias current values.

Controller A 111 uses the A-to-B status link to transmit 1006 the B-to-A channel status data to controller B 121. Once controller B 121 has received the channel status data, it can analyze 1008 the status of the B-to-A channels to determine whether to adjust the transmit power of any transmitters (e.g., by adjusting the transmitter bias currents of the transmitters). For instance, if the digital receiver bias current value for one or more of the receivers of device A 110 is lower than a predetermined minimum level—indicative of degraded signal quality for the communication channel(s) corresponding to the one or more receivers in question—controller B 121 could increase the transmit power for the corresponding transmitter(s) of device B 120 to compensate for the degraded signal. Alternately, the digital receiver bias current value for one or more of the receivers of device A 110 may be higher than a predetermined maximum level—perhaps indicating that the transmitter(s) of device B 120 corresponding to the one or more receivers in question are inefficiently receiving unnecessary transmit power—in which case controller B 120 could decrease the transmit power for the corresponding transmitter(s). In any event, controller B can adjust 1010 the transmitter bias currents accordingly after analyzing the status of the B-to-A channels.

Those skilled in the art will recognize that although the method 1000 of FIG. 10 is described and illustrated as a sequence of steps, it is not necessary that the steps be performed in the order shown. In one embodiment, controller A may monitor 1004 the status of the N B-to-A channels before establishing 1002 a status link. Further, the steps may overlap and repeat. For instance, controller A may simultaneously and continuously monitor 1004 and transmit 1006 to controller B the B-to-A channel status data while controller B simultaneously and continuously analyzes 1008 the status of the B-to-A channels and adjusts 1010 the transmit powers accordingly. Further, the method 1000 can be applied in both the A-to-B and the B-to-A directions without restriction. Thus, each of the controllers A and B can establish 1002 a status link with the other, monitor 1004 the status of N received channels and transmit 1006 the status of the N received channels to the other controller. Once each controller receives the channel status data, it can analyze 1008 the status of the channels and adjust 1010 the corresponding transmit powers accordingly.

Advantageously, embodiments of the present invention can identify degradation effects in one or more optical links and implement a redundant status link to adjust the transmit power of corresponding communication channels to compensate for the degradation effects. Because of the high reliability of the redundant status link, it can be relied on to actively maintain the required transmit power in each of the communication channels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a first multi-channel optoelectronic device, a method of establishing a redundant status link with a second multi-channel optoelectronic device, the method comprising:

generating a status link modulation signal from status data, the status link modulation signal comprising a low frequency modulation current and representative of the status data;

effectively applying the status link modulation signal to at least two transmitter bias currents to generate at least two status link modulated transmitter bias currents, including:

modulating a common reference voltage signal with the status link modulation signal to create a status-link modulated reference voltage signal, retrieving at least two digital transmitter bias current values from memory, and providing each digital transmitter bias current value and the status-link modulated reference voltage signal to a different one of at least two digital to analog converters to generate the at least two status-link modulated transmitter bias currents;

modulating each status-link modulated transmitter bias current with a different primary data modulation signal to obtain at least two resulting signals, wherein each primary data modulation signal comprises a high frequency modulation current and represents a different primary data electrical signal received by the optoelectronic device;

providing each resulting signal to a different optical transmitter for transformation into at least two optical signals; and transmitting the at least two optical signals over a multi-channel communication link to the second multi-channel optoelectronic device.

2. The method of claim 1, wherein the status data is indicative of one or more conditions affecting the performance of the multi-channel communication link.

3. The method of claim 2, wherein one or more conditions affecting the performance of the multi-channel communication link includes one or more of:

a non-functional channel;
potential exposure of one or more optical signals to view; and
insufficient optical signal intensity.

4. The method of claim 1, further comprising, detecting a redundant status link established by the second multi-channel optoelectronic device on at least two of a plurality of receive channels of the first multi-channel optoelectronic device.

5. The method of claim 4, wherein detecting the redundant status link established by the second multi-channel optoelectronic device includes:
receiving at least two optical signals by at least two optical receivers, each optical signal including primary data and status data, the status data being low frequency modulated over the primary data;
converting each of the at least two optical signals to at least two electrical signals, wherein a receiver bias current of each optical receiver is altered by the status data; and
detecting the receiver bias currents to extract the status data.

6. The method of claim 1, further comprising, effectively applying the status link modulation signal to three or more transmitter bias currents to provide additional status link redundancy.

7. In a first multi-channel optoelectronic device, a method of establishing a redundant status link with a second multi-channel optoelectronic device, the method comprising:
generating a status link modulation signal from status data, the status link modulation signal comprising a low frequency modulation current and representative of the status data;
effectively applying the status link modulation signal to at least two transmitter bias currents to generate at least two status link modulated transmitter bias currents, including:
retrieving at least two digital transmitter bias current values from memory, modulating each of the at least two digital transmitter bias current values with the status link modulation signal to create at least two digital status-link modulated transmitter bias current values, and providing each digital status-link modulated transmitter bias current value to a different one of at least two digital to analog converters, each of the digital to analog converters converting a different one of the digital status-link modulated transmitter bias current values into an analog status-link modulated transmitter bias current;
modulating each status-link modulated transmitter bias current with a different primary data modulation signal to obtain at least two resulting signals, wherein each primary data modulation signal comprises a high frequency modulation current and represents a different primary data electrical signal received by the optoelectronic device;
providing each resulting signal to a different optical transmitter for transformation into at least two optical signals; and
transmitting the at least two optical signals over a multi-channel communication link to the second multi-channel optoelectronic device.

8. The method of claim 7, further comprising:
determining that optical signals received from the second optoelectronic device are not potentially exposed to view; and
sending status data over the status link to the second optoelectronic device indicating it is safe for the second optoelectronic device to transmit optical signals to the first optoelectronic device at an aggregate optical transmit power that is greater than a predetermined eye safety limit.

9. The method of claim 8, wherein the second optoelectronic device establishes a redundant status link with the first optoelectronic device, determines whether the optical signals transmitted by the first optoelectronic device over the multi-channel communication link are potentially exposed to view, and sends status data to the first optoelectronic device indicating whether it is safe for the first optoelectronic device to transmit optical signals over the multi-channel communication link at an aggregate optical transmit power that is greater than a predetermined eye safety limit.

10. The method of claim 9, further comprising, receiving status data from the second optoelectronic device indicating that it is safe to transmit optical signals over the multi-channel communication link at an aggregate optical transmit power that is greater than a predetermined eye safety limit, and, in response to receiving the status data, transitioning to or maintaining operation in a transmit power mode where the aggregate optical transmit power of the optical signals transmitted over the multi-channel communication link is greater than the predetermined eye safety limit.

11. The method of claim 9, further comprising, receiving status data from the second optoelectronic device indicating that it is not safe to transmit optical signals over the multi-channel communication link at an aggregate optical power that is greater than the predetermined eye safety limit, maintaining operation in or transitioning to a transmit power mode where the aggregate optical transmit power of the optical signals transmitted over the multi-channel communication link is less than or equal to the predetermined eye safety limit.

12. The method of claim 11, wherein the transmit power mode where the aggregate optical transmit power of the optical signals transmitted over the multi-channel communication link is less than or equal to the predetermined eye safety limit is achieved by reducing the transmitter bias currents supplied to the transmitters, reducing the duty cycle of the transmitter bias currents, or both, relative to the transmit power mode where the aggregate optical transmit power of the optical signals is greater than the predetermined eye safety limit.

13. The method of claim 8, further comprising, determining that the optical signals received from the second optoelectronic device are potentially exposed to view; and in response, not sending status data over the status link to the second optoelectronic device indicating it is safe for the second optoelectronic device to transmit optical signals to the first optoelectronic device at an aggregate optical transmit power that is greater than the predetermined eye safety limit.

14. The method of claim 8, wherein determining that the optical signals received from the second optoelectronic device are not potentially exposed to view includes monitoring receiver bias currents of receivers of the first optoelectronic device.

* * * * *